(12) United States Patent
Ohashi et al.

(10) Patent No.: US 9,996,088 B2
(45) Date of Patent: Jun. 12, 2018

(54) ROTARY VALVE

(71) Applicant: Azbil Corporation, Tokyo (JP)

(72) Inventors: Tomofumi Ohashi, Tokyo (JP); Hideaki Someya, Tokyo (JP)

(73) Assignee: AZBIL CORPORATION, Tokyo (JP)

( * ) Notice: Subject to any disclaimer, the term of this patent is extended or adjusted under 35 U.S.C. 154(b) by 121 days.

(21) Appl. No.: 15/086,135

(22) Filed: Mar. 31, 2016

(65) Prior Publication Data

US 2016/0291607 A1 Oct. 6, 2016

(30) Foreign Application Priority Data

Mar. 31, 2015 (JP) .................. 2015-071286

(51) Int. Cl.
*G05D 7/06* (2006.01)
*F24F 5/00* (2006.01)

(52) U.S. Cl.
CPC ......... *G05D 7/0635* (2013.01); *F24F 5/0003* (2013.01); *F24F 11/83* (2018.01); *F24F 11/84* (2018.01)

(58) Field of Classification Search
CPC .............. G05D 7/0635; F16K 37/0058; F16K 37/0091; F16K 37/005; F16K 31/04; Y10T 137/776; Y10T 137/7761; F24F 5/003; F24F 11/83–11/84
See application file for complete search history.

(56) References Cited

U.S. PATENT DOCUMENTS

2009/0120515 A1* 5/2009 Ohtani .................. F16K 1/32
137/553

2014/0019009 A1 1/2014 Kogiso
2014/0261714 A1* 9/2014 Burt .................... G05D 23/1919
137/10

FOREIGN PATENT DOCUMENTS

| JP | H06-272935 A | 9/1994 |
|---|---|---|
| JP | H11211191 A | 8/1999 |
| JP | 2003-271245 A | 9/2003 |
| JP | 2009-115271 A | 5/2009 |

(Continued)

OTHER PUBLICATIONS

Korean Office Action dated May 23, 2017 in Patent Application No. 10-2016-0039172 (English Translation only).

*Primary Examiner* — Mary McManmon
*Assistant Examiner* — Nicole Gardner
(74) *Attorney, Agent, or Firm* — Oblon, McClelland, Maier & Neustadt, L.L.P.

(57) ABSTRACT

A valve opening setpoint corrector and a correction table storage are provided in a flow rate controlling valve. A correction table indicating valve opening correction values corresponding to combinations of amounts of opening of a valve and front-back differential pressures across the valve is stored in the correction table storage. In the valve opening setpoint corrector a correction value acquirer acquires, from the correction table, the valve opening correction value α that corresponds to the inputted measured value of the valve and front-back differential pressure across the valve and sends it to the setpoint corrector, as a correction value that takes into account the amount of twist in the valve rod. The setpoint corrector corrects, by the correction value taking into account the amount of twist in the valve rod, the valve opening setpoint from the air conditioning controller, sending this corrected valve opening setpoint to the valve opening controller.

6 Claims, 10 Drawing Sheets

(56) References Cited

FOREIGN PATENT DOCUMENTS

| | | | |
|---|---|---|---|
| JP | 2009-245096 | A | 10/2009 |
| JP | 2012-211857 | A | 11/2012 |
| KR | 10-1997-0046763 | A | 7/1997 |

* cited by examiner

| Opening / Diff. Pres. | 0% | ... | 50% | ... | 100% |
|---|---|---|---|---|---|
| 0kPa | 0%FS | ... | 0%FS | ... | 0%FS |
| · | · | · | · | · | · |
| · | · | · | · | · | · |
| · | · | · | · | · | · |
| 300kPa | ... | ... | 0.1%FS | ... | ... |
| · | · | · | · | · | · |
| · | · | · | · | · | · |
| · | · | · | · | · | · |
| 1000kPa | ... | ... | 0.3%FS | ... | ... |

α: Valve Opening Correction Value

FIG. 7(a)

Correction Table for a Change in the Closing Direction (First Correction Table)    TA1

| Opening<br>Diff. Pres. | 0% | ... | 50% | ... | 100% |
|---|---|---|---|---|---|
| 0kPa | 0%FS | ... | 0%FS | ... | 0%FS |
| . | . | . | . | . | . |
| . | . | . | . | . | . |
| . | . | . | . | . | . |
| 300kPa | ... | ... | −0.1%FS | ... | ... |
| . | . | . | . | . | . |
| . | . | . | . | . | . |
| . | . | . | . | . | . |
| 1000kPa | ... | ... | −0.3%FS | ... | ... |

$\alpha_1$: Valve Opening Correction Values (Negative Values)

FIG. 7(b)

Correction Table for a Change in the Opening Direction (Second Correction Table)    TA2

| Opening<br>Diff. Pres. | 0% | ... | 50% | ... | 100% |
|---|---|---|---|---|---|
| 0kPa | 0%FS | ... | 0%FS | ... | 0%FS |
| . | . | . | . | . | . |
| . | . | . | . | . | . |
| . | . | . | . | . | . |
| 300kPa | ... | ... | +0.1%FS | ... | ... |
| . | . | . | . | . | . |
| . | . | . | . | . | . |
| . | . | . | . | . | . |
| 1000kPa | ... | ... | +0.3%FS | ... | ... |

$\alpha_2$: Valve Opening Correction Values (Positive Values)

ROTARY VALVE

CROSS-REFERENCE TO RELATED APPLICATION

This application claims priority to Japanese Application No. 2015-071286 filed Mar. 31, 2015. This application is incorporated herein by reference in its entirety.

FIELD OF TECHNOLOGY

The present invention relates to a rotary valve for rotating a valve rod that is connected to a valve unit to control a flow rate of a fluid flowing in a flow path.

BACKGROUND

Conventionally, there have been air conditioning controlling systems that control flow rates of hot and cold water to an air conditioner (referencing, for example, Japanese Unexamined Patent Application Publication Nos. H11-211191 and H06-272935). In these air conditioning controlling systems, flow rate controlling valve are provided in the supply routes for hot water/cold water to the air conditioner, where the valve unit within the flow rate controlling valve is driven to adjust the amount of opening of the flow path through which the hot/cold water flows.

Normally, in a flow rate controlling valve, an opening setting (a valve opening setpoint) is inputted from the air conditioning controlling device, and with the measured opening of the valve unit, detected by a valve opening detector, as a valve opening a measured value, the valve unit is driven so as to cause the valve opening measured value to match the valve opening setpoint.

For example, with the flow rate controlling valve disclosed in Japanese Unexamined Patent Application Publication No. 2009-245096, a motor is provided for rotating a valve rod that is connected to a valve unit, and a valve opening detector is provided for detecting the actual opening of the valve unit from the rotational position of the valve rod, where the measured opening of the valve unit, detected by the opening detector, and the valve opening measured value is used as a valve opening measured value, and the amount by which the valve rod is rotated by the motor is controlled so that this valve opening measured value will match the valve opening set point.

However, with the flow rate controlling valve (rotary valve) of the type that rotates a valve rod that is connected to a valve unit, as disclosed in Japanese Unexamined Patent Application Publication No. 2009-245096, the valve rod becomes twisted due to the pressure of the fluid that is flowing. That is, when a front-back differential pressure (fluid pressure) is reduced, this pressure acts on the valve unit, and produces a frictional force between the valve rod and the bearing that supports the valve rod. This frictional force produces a torque in the valve rod, and a twist is produced in accordance with this torque.

When a twist is produced in the valve rod, this produces an error between the measured opening of the valve unit (the valve opening measured value) and detected from the rotational position of the valve rod and the actual opening of the valve unit (the valve opening actual value). Because of this, this produces an error between the actual opening of the valve unit (the valve opening actual value) and the desired opening (the valve opening setpoint), which has a negative effect on the accuracy with which the opening is controlled.

The present disclosure is to solve problems such as described above, and the object thereof is to provide a rotary valve able to achieve high-precision opening control.

SUMMARY

In order to achieve the object set forth above, the present invention is a rotary valve having a valve unit for adjusting the amount of opening of a flow path through which a fluid flows; a valve rod that is linked to the valve unit; a driving portion for rotating the valve rod; a valve opening detector for detecting a measured opening of the valve unit from a rotational position of the valve rod; an opening controlling portion for using, as a valve opening measured value, a measured amount of opening of the valve unit, detected by the valve opening detector, to control a rotation quantity of the valve rod by the driving portion so that this valve opening measured value matches a valve opening setpoint; and a valve opening setpoint correcting portion for correcting the valve opening setpoint by a correction value that takes into account an amount of twist of the valve rod.

Given this invention, the valve opening setpoint is corrected by a correction value that takes into account the amount of twist in the valve rod, and the amount of rotation of the valve rod is controlled so that the valve opening measured value matches the corrected valve opening setpoint. The amount of twist in the valve rod can be known from the relationship between the amount of opening of the valve unit and the amount of twist, or from the relationship between the front-back differential pressure across the valve unit and the amount of twist. Moreover, it can be known from the relationship between the amount of twist and the combination of the amount of opening of the valve unit and the front-back differential pressure across the valve unit.

The present invention focuses on the amount of twist in the valve rod, which can be known through such relationships, and corrects the valve opening setpoint by a correction value that takes this amount of twist into account, to thereby control the amount of rotation of the valve rod to cause the valve opening measured value to match the corrected valve opening setpoint, to thus eliminate the error that is produced between the actual opening (the valve opening actual value) and the desired opening (the valve opening setpoint).

In the present invention, the valve opening setpoint is corrected by a correction value that takes into account the amount of twist in the valve rod, thus enabling high-precision control of the opening by eliminating the error that occurs between the actual opening (the valve opening actual value) and the desired opening (the valve opening setpoint).

BRIEF DESCRIPTIONS OF THE DRAWINGS

FIG. 5(b) is a diagram for explaining the situation wherein, in this flow rate controlling valve, the valve unit 14 is also rotated by the amount of the correction value α that takes into account the amount of twist of the valve rod 15, rotating together with the rotation of the valve rod 15.

Figure 6:
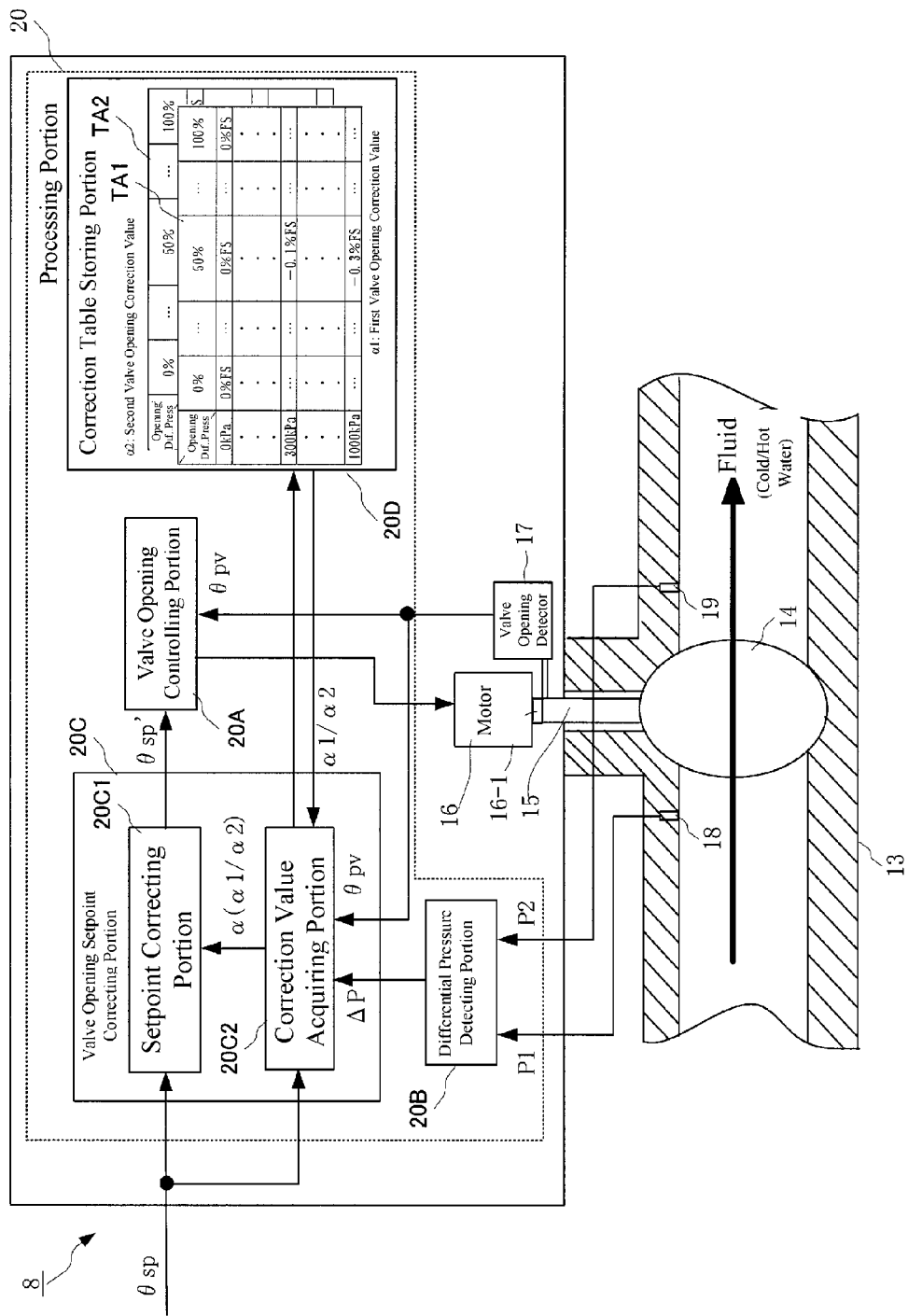

FIG. 6 is a diagram illustrating portions of a flow rate controlling valve of another example.

FIG. 7(a) is a diagram illustrating an example of a correction table used by the flow rate controlling valve of the other example for a change in the closing direction.

FIG. 7(b) is a diagram illustrating an example of a correction table used by the flow rate controlling valve of the other example for a change in the opening direction.

Figure 4:
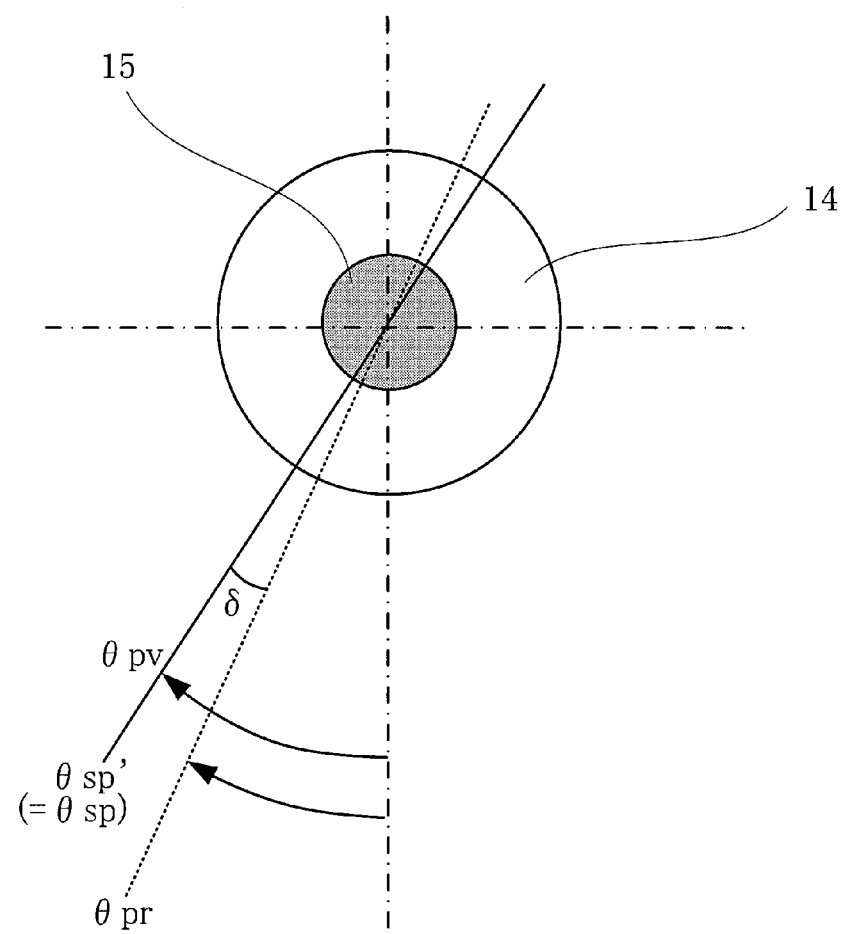
FIG. 4 is a diagram for explaining the error δ that occurs between the actual opening of the valve unit (the valve opening actual value) θpr and the desired opening (the valve opening setpoint) θsp in this flow rate controlling valve, assuming that the correction value is 0.
Figure 8A:
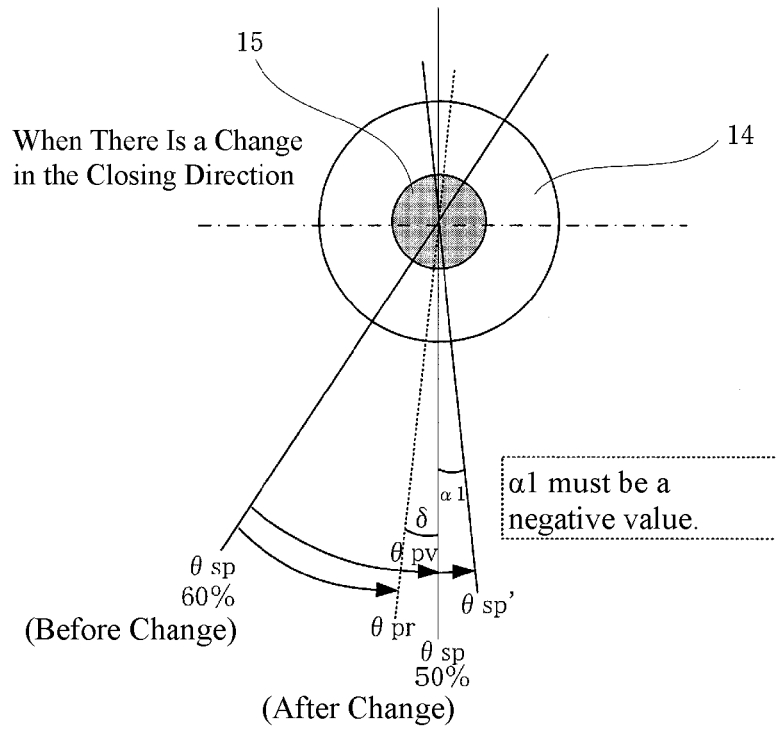

FIG. 8(a) is a diagram corresponding to FIG. 4, for the case wherein the opening setpoint θsp is changed from, for example, 60% to 50%.

Figure 8B:
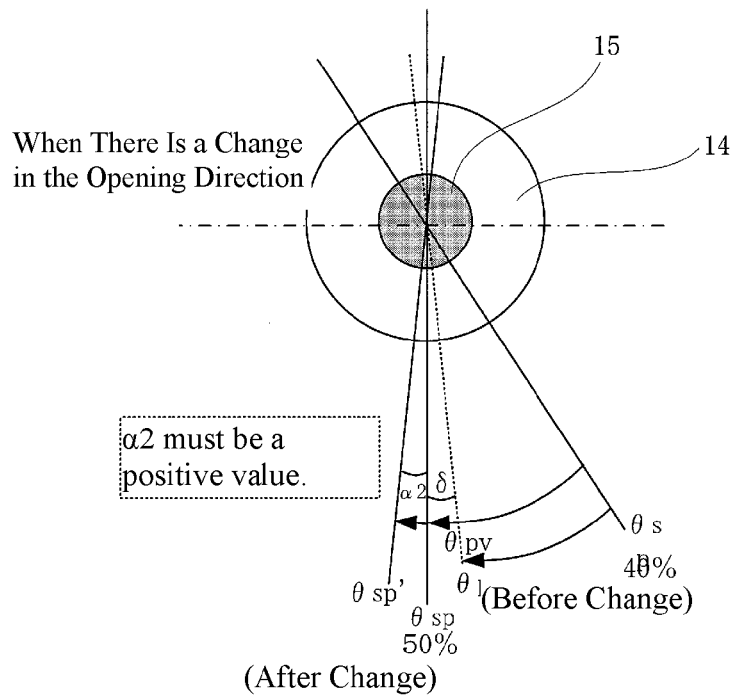

FIG. 8(b) is a diagram corresponding to FIG. 4, for the case wherein the opening setpoint θsp is changed from, for example, 40% to 50%.

Figure 9:
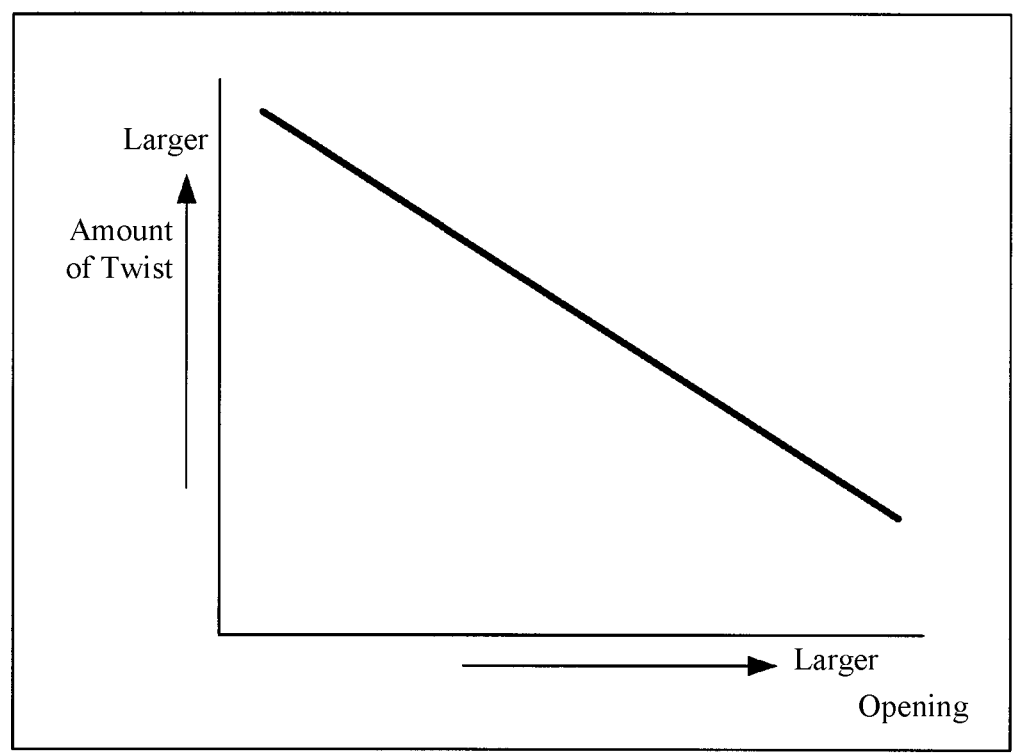

FIG. 9 is a diagram illustrating the relationship between the opening and the amount of twist in the valve unit.

Figure 10:
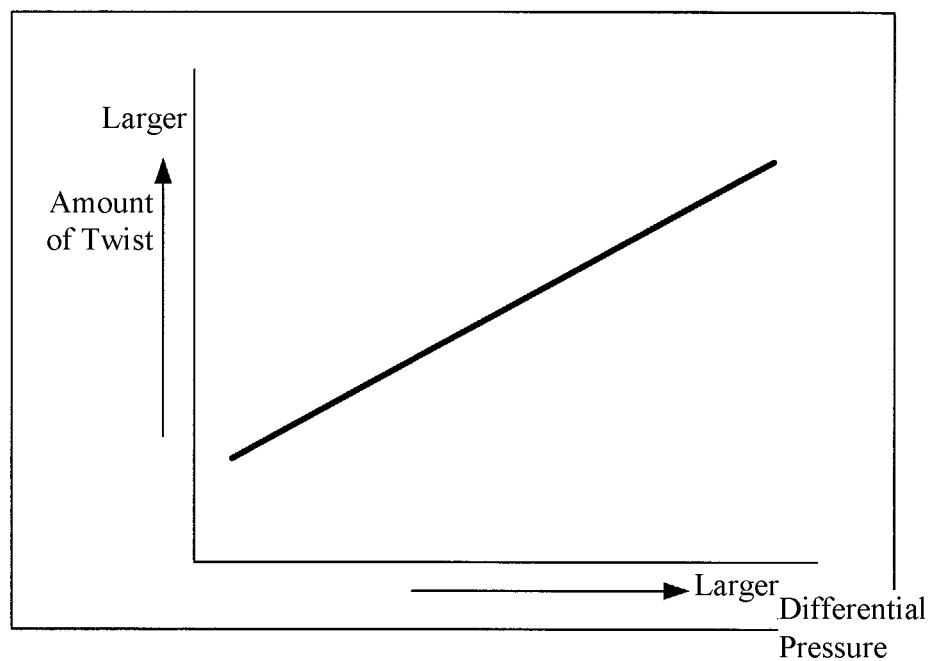

FIG. 10 is a diagram illustrating the relationship between the front-back differential pressure across the valve unit and the amount of twist.

DETAILED DESCRIPTION

Figure 1:
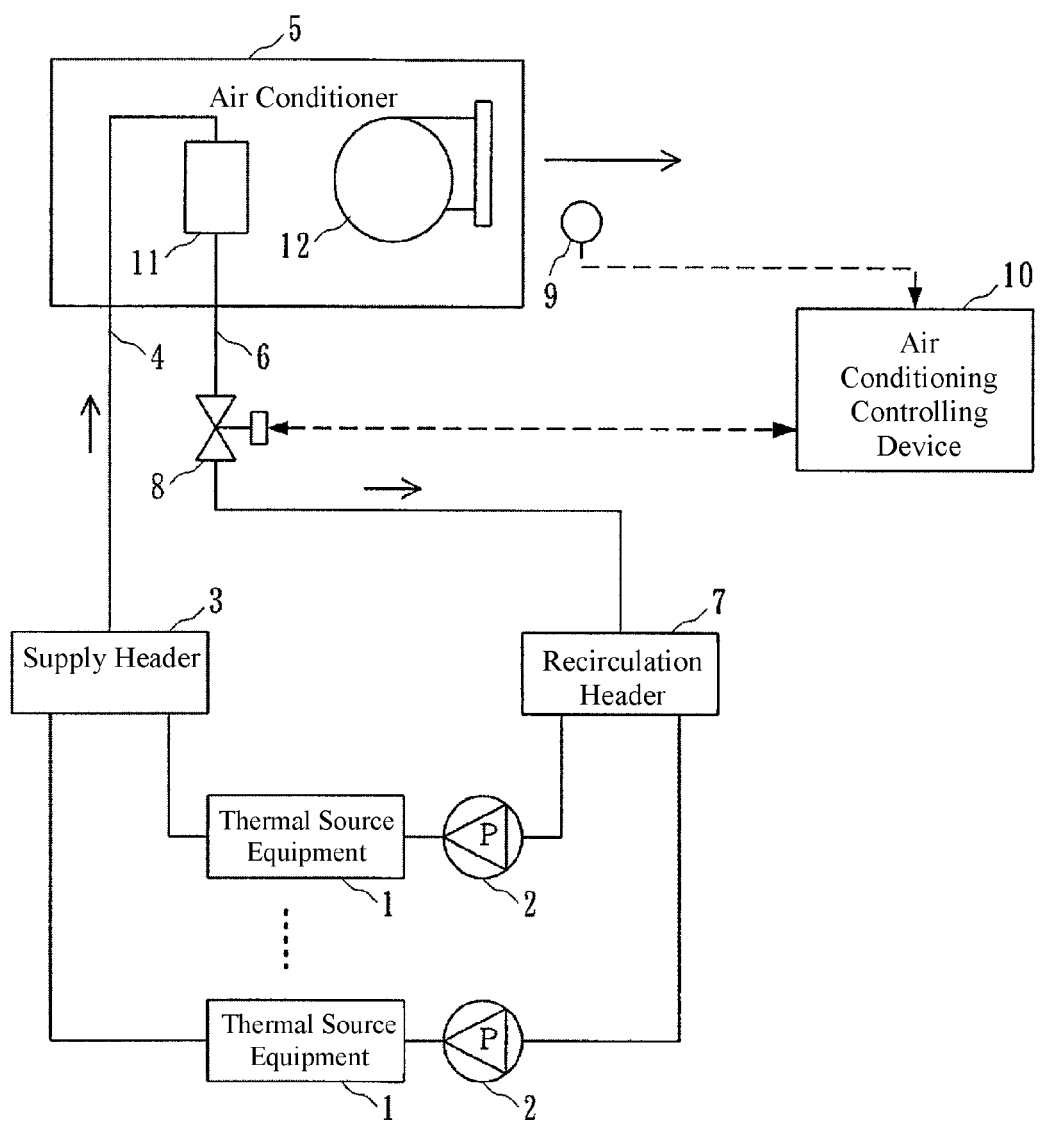
FIG. 1 is an instrumentation diagram illustrating an example of an air conditioning controlling system that uses a rotary valve according to the present invention.

An example according to the present disclosure will be explained below in detail, based on the drawings. FIG. 1 is an instrumentation diagram illustrating an example of an air conditioning controlling system that uses a rotary valve according to the present invention.

In FIG. 1: 1 is thermal source equipment for producing hot/cold water; 2 is a pump for pumping hot/cold water produced by the thermal source equipment 1; 3 is a supply header for mixing hot/cold water from a plurality of thermal source equipment 1; 4 is a supply water pipeline; 5 is an air conditioner that receives a supply of hot/cold water that is fed from the supply header 3 through the supply water pipeline 4; 6 is a recirculating pipeline; 7 is a recirculation header for returning the hot/cold water that has undergone heat exchange in the air conditioner 5 and that has been fed through the recirculating pipeline 6; 8 is a flow rate controlling valve (rotary valve) for controlling the flow rate of the hot/cold water supplied to the air conditioner 5 from the supply header 3; 9 is a supply air temperature sensor for measuring the temperature of the supply air that is blown out from the air conditioner 5; 10 is an air conditioning control device; 11 is a coil of the air conditioner 5, and 12 is a blower.

In this air conditioning controlling system, hot/cold water that has been pumped by the pump 2 and to which a calorific value has been applied through the thermal source equipment 1 is mixed in the supply header 3, and supplied to the air conditioner 5 through the supply water pipeline 4, to pass through the air conditioner 5 and to arrive, as return water, at the recirculation header 7 through the recirculating pipeline 6, to be pumped again by the pump 2, to recirculate through the path described above. For example, in the case of a cooling operation, cold water is produced by the thermal source equipment 1, and this cold water is circulated. In the case of a heating operation, hot water is produced by the thermal source equipment 1, and this hot water is circulated.

The air conditioner 5 cools or heats, through passing hot/cold water through the coil 11, a mixture of outside air and air that has been returned (termed "recirculated air"), that has been returned from the controlled area by the air conditioning controlling system, and this cooled or heated air is sent to the controlled area as supply air through a blower 12. The air conditioner 5 is a single-type air conditioner that uses the same coil 11 for both cooling operations and heating operations, where a rotary valve according to the present invention is provided, as the flow rate controlling valve 8, in the recirculating pipeline 6 for the hot/cold water that is recirculated within the air conditioner 5.

Figure 2:
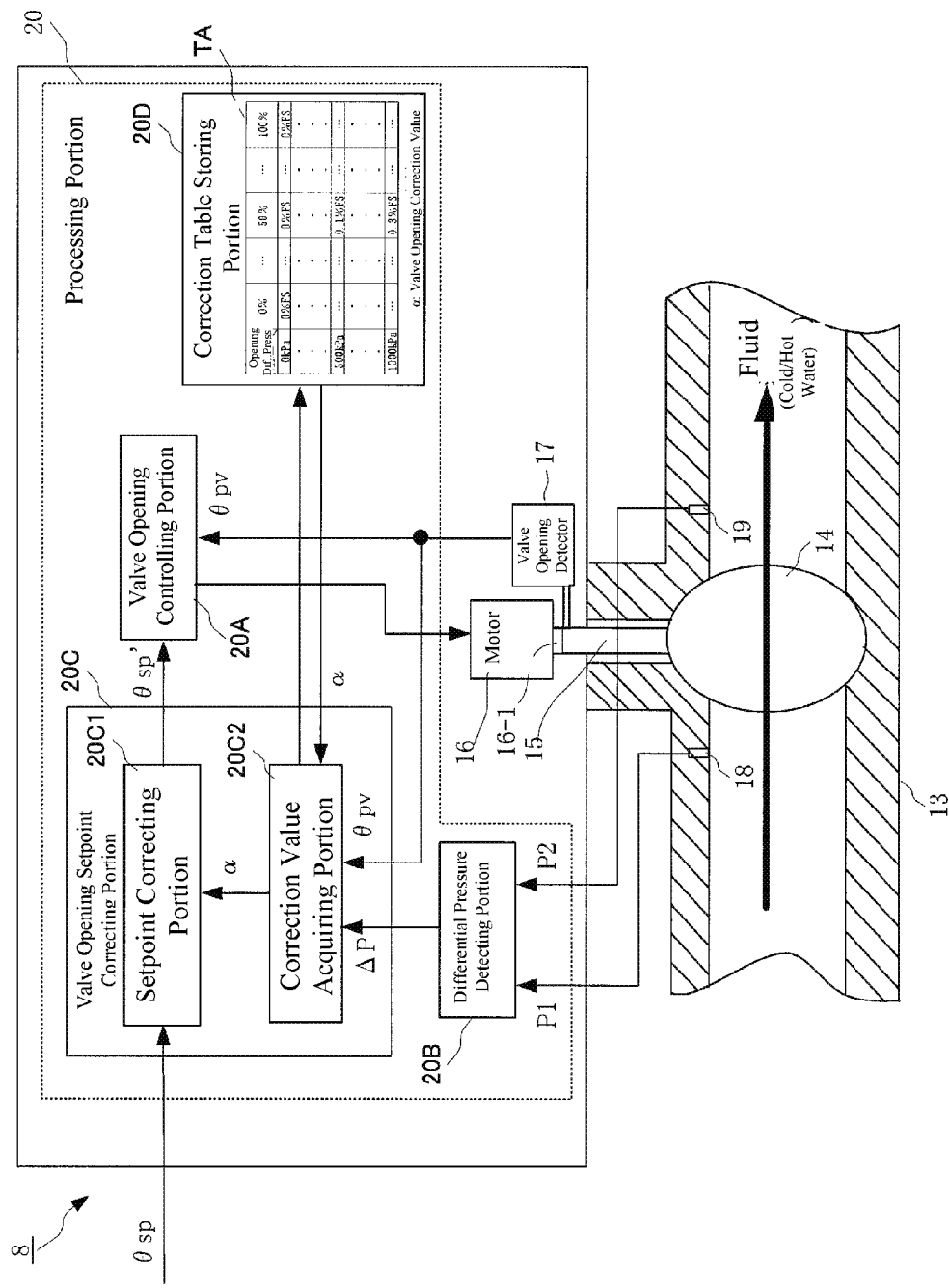
FIG. 2 is a diagram illustrating portions of an example of a flow rate controlling valve (a rotary valve) used in this air conditioning controlling system.

FIG. 2 is a diagram illustrating critical portions of the flow rate controlling valve 8 that is used in this air conditioning controlling system. The flow rate controlling valve 8 is provided with: a pipeline 13 that forms a flow path into which flows the hot/cold water that passes through the air conditioner 5; a valve unit 14 for adjusting the flow rate of the fluid that flows in the pipeline 13 (for adjusting the amount of opening of the flow path); a valve rod 15 that is linked to the valve unit 14; a motor 16 that rotates this valve rod 15; a valve opening detector 17 for detecting a measured opening θpv of the valve unit 14 from the rotational position of the valve rod 15 that is connected to a driveshaft 16-1 of the motor 16 (that is, the rotational position in the vicinity of the driveshaft 16-1); a primary side pressure sensor 18 for detecting, as a primary pressure P1, the pressure of the fluid on the primary side of the valve unit 14 within the pipeline 13; a secondary side pressure sensor 19 for detecting, as a secondary pressure P2, the pressure of the fluid on the secondary side of the valve unit 14 within the pipeline 13; and a processing portion 20.

The processing portion 20 is provided with a valve opening controlling portion 20A, a differential pressure detecting portion 20B, a valve opening setpoint correcting portion 20C, and a correction table storing portion 20D. The valve opening setpoint correcting portion 20C comprises: a setpoint correcting portion 20C1, and a correction value acquiring portion 20C2.

The differential pressure detecting portion 20B inputs the primary pressure P1 of the fluid from the primary side pressure sensor 18 and the secondary pressure P2 of the fluid from the secondary side pressure sensor 19 to detect the differential pressure between the primary pressure P1 and the secondary pressure P2 as the front-back differential pressure ΔP across the valve unit 14. Note that a differential pressure sensor may be provided instead of the primary side pressure sensor 18 and the secondary side pressure sensor 19, to enable the differential pressure ΔP to be detected directly using the differential pressure sensor.

Figure 3:
FIG. 3 is a diagram illustrating an example of a correction table used by this flow rate controlling valve.

A correction table TA (referencing FIG. 3), which shows the valve overcorrection values α corresponding to combinations of degrees of opening of the valve unit 14 and front-back differential pressures across the valve unit 14, is stored in the correction table storing portion 20D. In this correction table TA, the valve opening correction values α are values that have been found experimentally, being values that express, in terms of the opening (% FS), the amounts of twist in the valve rod 15 corresponding to the amounts of opening of the valve unit 14 and the front-back differential pressures across the valve unit 14.

Note that in this correction table TA, the valve opening correction values α, which indicate the amount of twist in the valve rod 15, may instead be values expressed in terms of angles (°), operating times (s), manipulated variables (mm), control signal magnitudes (V or A), or the like. In the present example, the amount of twist in the valve rod 15 is an opening value expressed in terms of % FS (proportion of the full scale).

Moreover, in the present example, the processing portion 20 may be achieved through hardware having a processor and a storage device and a program that achieves the various types of functions in cooperation with this hardware.

The distinctive processing operations in the flow rate controlling valve 8 will be explained below, focusing on the functions of the valve opening controlling portion 20A and the valve opening setpoint correcting portion 20C in the processing portion 20.

Note that, in this example, an opening setting (a valve opening setpoint) θsp that can assume values between 0 and 100% is applied to the flow rate controlling valve 8 by the air conditioning controlling device 10 so as to maintain the temperature of the controlled area at a set temperature.

In the flow rate controlling valve 8, the valve opening setpoint θsp from the air conditioning controlling device 10 is set to θsp' through the opening setpoint correcting portion 20C, and sent to the valve opening controlling portion 20A. Here, for ease in understanding the explanation, it is first assumed that the correction value α in the valve opening setpoint correcting portion 20C is 0, so that the valve opening setpoint θsp is sent as-is, as θsp', to the valve opening controlling portion 20A.

The valve opening controlling portion 20A uses the measured opening θpv, from the valve opening detector 17, as the valve opening measured value, and sends a command to the motor 16 so as to cause the valve opening measured value θpv to match the valve opening setpoint θsp' (=θsp). Through this, the valve rod 15 is rotated to cause the valve opening measured value θpv to match the valve opening setpoint θsp' (=θsp) (referencing FIG. 4).

However, in this flow rate controlling valve 8, a twist is produced in the valve rod 15 due to the pressure of the flowing fluid. Because of this, the valve opening detector 17 produces an error δ between the measured opening (the valve opening measured value) θpv of the valve unit 14, detected from the rotation position of the valve rod 15, and the actual opening (the valve opening actual value) θpr of the valve unit 14. Because of this, even though the measured opening for the valve unit 14 (the valve opening measured value) θpv matches the desired opening (the valve opening setpoint) θsp, there will still be an error δ between the actual opening of the valve unit 14 (the valve opening actual value) θpr and the desired opening (the valve opening setpoint) θsp.

However, in the present example a valve opening setpoint correcting portion 20C is provided in a preliminary stage of the valve opening controlling portion 20A, to eliminate the error δ that occurs between the actual opening of the valve unit 14 (the valve opening actual value) θpr and the desired opening (the valve opening setpoint) θsp, through correcting the valve opening setpoint θsp in the valve opening setpoint correcting portion 20C. The correction to the valve opening setpoint θsp by the valve opening setpoint correcting portion 20C will be explained below.

In the valve opening setpoint correcting portion 20C, a correction value acquiring portion 20C2 acquires, from the correction table TA, the valve opening correction value α that corresponds to the inputted measured value θpv of the valve unit 14, detected by the valve opening detector 17, and front-back differential pressure ΔP across the valve unit 14, detected by the differential pressure detecting portion 20B, and sends, to the setpoint correcting portion 20C1, as a correction value α that takes into account the amount of twist in the valve rod 15, this valve opening setpoint θsp that has been acquired.

The setpoint correcting portion 20C1 corrects, by the correction value α that takes into account the amount of twist in the valve rod 15, sent from the correction value acquiring portion 20C2, the valve opening setpoint θsp from the air conditioning controlling device 10, to send this corrected valve opening setpoint θsp, as the valve opening setpoint θsp', to the valve opening controlling portion 20A. In this example, the correction value α that takes into account the amount of twist in the valve rod 15 is added to the valve opening setpoint θsp, where the valve opening setpoint θsp to which the correction value α has been added is defined as the corrected valve opening setpoint θsp' (θsp'=θsp+α).

The valve opening controlling portion 20A uses the measured opening θpv, from the valve opening detector 17, as the valve opening measured value, and sends a command to the motor 16 so as to cause the valve opening measured value θpv to match the corrected valve opening setpoint θsp' (=θsp+α).

Figure 5:
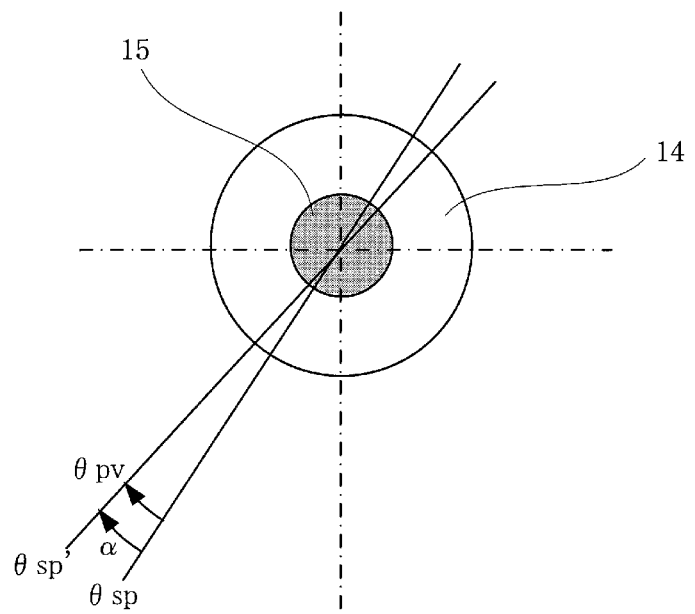
FIG. 5($a$) is a diagram for explaining the situation wherein, in this flow rate controlling valve, the valve rod 15 is rotated to cause the valve opening measured value θpv to match the valve opening setpoint θsp' (=θsp+α).
Figure 5:
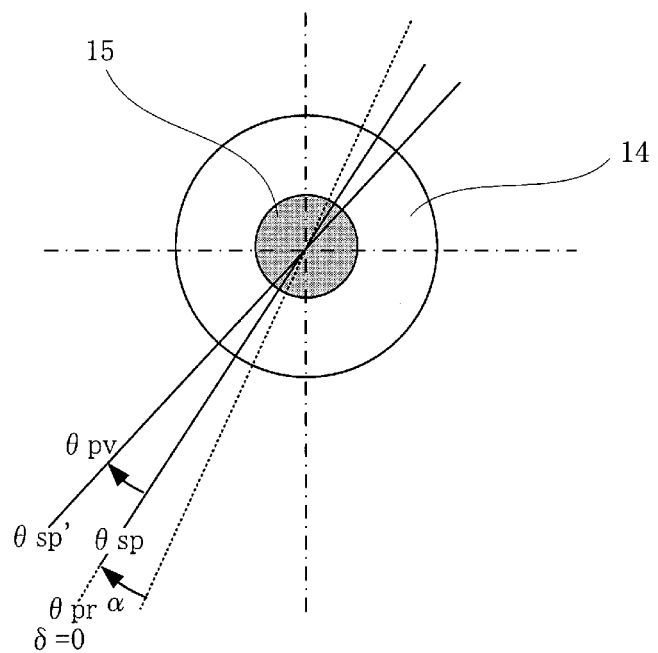

Given this, the valve rod 15 is rotated to cause the valve opening measured value θpv to match the valve opening setpoint θsp' (=θsp+α) (referencing FIG. 5 (*a*)). In this case, the valve unit 14 is also rotated by the amount of the correction value α that takes into account the amount of twist of the valve rod 15, rotating together with the rotation of the valve rod 15 (referencing FIG. 5 (*b*)). As a result, the error δ that occurs between the actual opening of the valve unit 14 (the valve opening actual value) θpr and the desired opening (the valve opening setpoint) θsp is eliminated.

For example, in the state illustrated in FIG. 4, when the measured opening θpv of the valve unit 14 is 50% (θsp=50%) and the front-back differential pressure ΔP of the valve unit 14 is 300 kPa, the correction value acquiring portion 20C2 acquires 0.1% FS, as the valve opening correction value α, from the correction table TA, and thus the valve opening setpoint θsp' that has been corrected by the setpoint correcting portion 20C1 will be θsp'=θsp+α=50%+0.1%=50.1%. The result is that the valve opening controlling portion 20A will drive the motor 16 to rotate the valve rod 15 until the measured opening θpv of the valve unit 14 reaches 50.1%. Through this, the actual opening (the valve opening actual value) θpr of the valve unit 14 is caused to match the desired opening (valve opening setpoint) θsp=50%.

In this way, the present invention enables high-precision control of opening by eliminating the error δ that occurs between the actual opening (the valve opening actual value) θpr and the desired opening (the valve opening setpoint) θsp, through correcting the valve opening setpoint θsp by a correction value that takes the amount of twist in the rod valve 15 into account.

Note that in this correction table TA, even if the valve opening correction values α are expressed in terms of angles (°), operating times (s), manipulated variables (mm), control signal magnitudes (V or A), or the like, instead of the opening (% FS), correcting the valve opening setpoint θsp still makes it possible to eliminate the error δ that occurs between the actual opening (the valve opening actual value) θpr and the desired opening (the valve opening setpoint) θsp of the valve unit 14.

Application of the present invention to a flow rate controlling valve that is to provided with upstream and downstream pressure sensors, as disclosed in, for example, Japanese Unexamined Patent Application Publication 2009-245096 and 2009-115271, and the like, eliminates the need for dedicated sensors or detection circuits, and the like, thereby achieving improved precision in the control of the opening, without increasing the cost through hardware.

In the previous example illustrated in FIG. 2, a single correction table was stored in the correction table storing portion 20D; however, as illustrated in FIG. 6 as another example, two correction tables, that is, a correction table (the first correction table) TA1, for a change in the closing direction (referencing FIG. 7 (a)), and a correction table (the second correction table) TA2, for a change in the opening direction (referencing FIG. 7 (b)), are stored in the correction table storing portion 20D, in consideration of the direction of change in the valve opening setpoint θsp.

In this case, first valve opening correction values α1 are set corresponding to the combinations of the amounts of opening of the valve unit 14 and the front-back differential pressures across the valve unit 14, in the correction table TA1 for a change in the closing direction, where all of the first valve opening correction values α1 are negative values. Moreover, second valve opening correction values α2 are set corresponding to the combinations of the amounts of opening of the valve unit 14 and the front-back differential pressures across the valve unit 14, in the correction table TA2 for a change in the opening direction, where all of the second valve opening correction values α2 are negative values.

The direction of change in the valve opening setpoint θsp is evaluated in the correction value acquiring portion 20C2, where if the change is in the direction wherein the valve opening setpoint θsp is reduced (that is, in the closing direction), then the first valve opening correction value α1 that corresponds to the measured opening θpv of the valve unit 14, detected by the valve opening detector 17, and the front-back differential pressure ΔP across the valve unit 14, detected by the differential pressure detecting portion 20B, is acquired from the correction table for a change in the closing direction (the first correction table) TA1. If the change is in the direction wherein the valve opening setpoint θsp is increasing (that is, in the opening direction), then the second valve opening correction value α2 that corresponds to the measured opening θpv of the valve unit, detected by the valve opening detector 17 and the front-back differential pressure ΔP across the valve unit 14, detected by the differential pressure detecting portion 20B, is acquired from the correction table for a change in the opening direction (the second correction table) TA2. Given this, the first valve opening correction value α1 or the second valve opening correction value α2 that has been acquired is sent, as the valve opening setpoint α, to the setpoint correcting portion 20C1.

Note that the reason why all of the first valve opening correction values α1 in the correction table TA1 for a change in the closing direction are negative values and why all of the second valve opening correction values α2 in the correction table TA2 for a change in the opening direction are positive values is as follows.

FIG. 8 (a) presents a diagram corresponding to FIG. 4, for the case wherein the opening setpoint θsp is changed from, for example, 60% to 50%. In this case, there will be an error δ between the actual opening (the valve opening actual value) θpr of the valve unit 14 and the desired opening (the valve opening setpoint) θsp, and thus it is necessary to reduce the valve opening setpoint θsp=50%. Because of this, the first valve opening correction value α1, as a negative value, reduces the valve opening setpoint θsp.

A diagram corresponding to FIG. 4, illustrating the case wherein the opening setpoint θsp is changed from, for example, 40% to 50% is presented in FIG. 8 (b). In this case, an error δ is produced between the actual opening of the valve unit 14 (the valve opening actual value) θpr and the desired opening (the valve opening setpoint) θsp, and thus it is necessary to increase the valve opening setpoint θsp=50% in order to eliminate this error δ. Because of this, the second valve opening correction value α2, as a positive value, increases the valve opening setpoint θsp.

Note that in the first example (the example illustrated in FIG. 2), when one considers the direction of change of the valve opening setpoint θsp, the direction of change of the valve opening setpoint θsp may be evaluated by the setpoint correcting portion 20C1, where if the change is in the direction wherein the valve opening setpoint θsp is reduced, then the correction value θ may be added, as a negative value, to the valve opening setpoint θsp, and if the change is in the direction wherein the valve opening setpoint θsp is increasing, then the correction value α may be added, as a positive value, to the valve opening setpoint θsp.

Moreover, while in the example set forth above the correction value that takes the amount of twist of the valve rod 15 into consideration was a value corresponding to the measured opening θpv of the valve unit 14 and to the front-back differential pressure ΔP across the valve unit 14, it need not necessarily be a value corresponding to the measured opening θpv of the valve unit 14 and the front-back differential pressure ΔP across the valve unit 14.

For example, the amount of twist in the valve rod 15 can be known from the relationship between the amount of opening of the valve unit 14 and the amount of twist, (referencing FIG. 9), or from the relationship between the front-back differential pressure across the valve unit 14 and the amount of twist (referencing FIG. 10). Such relationships can be used to establish the correction value that takes the modern twist of the valve rod 15 into account as a value corresponding to the measured opening θpv of the valve unit 14, or to establish the correction value that takes the modern twist of the valve rod 15 into account as a value corresponding to the front-back differential pressure ΔP across the valve unit 14.

Moreover, while, in the example set forth above, the correction value that takes into account the amount of twist in the valve rod 15 was acquired from a table (using a table method), it may instead be obtained through establishing an equation and performing a calculation (an arithmetic method).

Note that while in the examples set forth above the explanations were for examples wherein air conditioners were used for the air-conditioning equipment, the air-conditioning equipment is not limited to being air conditioners. In particular, this may be applied to a flow rate controlling system for process control. Moreover, there is no limitation to cold water/hot water, but rather to the present invention may be applied to a variety of fluids, such as gasses.

While the present disclosure has been explained above in reference to an example, the present disclosure is not limited to the example set forth above. The structures and details in the present disclosure may be varied in a variety of ways, as can be understood by one skilled in the art, within the scope of technology in the present disclosure.

We claim:

1. A rotary valve device, comprising:
a valve to adjust an amount of opening of a flow path through which a fluid flows;
a valve rod linked to the valve;
a driver configured to rotate the valve rod; and
processing circuitry configured to
detect an amount of opening of the valve from a rotational position of the valve rod,
use, as a valve opening measured value, the detected amount of opening of the valve to control, using a control process, a rotation quantity of the valve rod by the driver so that the valve opening measured value will match an initial valve opening setpoint, and
correct the initial valve opening setpoint to generate a corrected valve opening setpoint, to use in the control process, by a correction value that takes into account an amount of twist of the valve rod not reflected in the detected amount of opening of the valve.

2. The rotary valve device as set forth in claim 1, further comprising:
a differential pressure detector configured to detect, as a front-back differential pressure across the valve, a differential pressure between a pressure of a fluid on a primary side of the valve and a pressure of a fluid on a secondary side of the valve, wherein
the processing circuitry is further configured to calculate the correction value, which takes into account the amount of twist of the valve rod, based on the detected amount of opening of the valve and the detected front-back differential pressure across the valve, to correct, by the calculated correction value, the initial valve opening setpoint.

3. The rotary valve device as set forth in claim 2, further comprising:
a memory storing a correction table indicating a valve opening correction value corresponding to a combination of the amount of opening of the valve and the front-back differential pressure across the valve, wherein:
the processing circuitry is further configured to acquire, from the correction table, a particular valve opening correction value corresponding to the detected amount of opening of the valve and the detected front-back differential pressure across the valve, and use the acquired particular valve opening correction value as the correction value that takes into account the amount of twist of the valve rod.

4. The rotary valve device as set forth in claim 2, further comprising:
a memory storing a first correction table indicating a first valve opening correction value corresponding to a combination of the amount of opening of the valve and the front-back differential pressure across the valve, and a second correction table indicating a second valve opening correction value corresponding to a combination of the amount of opening of the valve and the front-back differential pressure across the valve,
wherein the processing circuitry is further configured to
when the valve opening setpoint decreases, acquire, from the first correction table, a particular first valve opening correction value that corresponds to the detected amount of opening of the valve and the detected front-back differential pressure across the valve, and
when the valve opening setpoint increases, acquire, from the second correction table, a particular second valve opening correction value that corresponds to the detected amount of opening of the valve and the detected front-back differential pressure across the valve, and
use, as the correction value that takes into account the twist of the valve rod, one of the first particular valve opening correction value and the second particular valve opening correction value.

5. The rotary valve device as set forth in claim 4, wherein:
each of the first valve opening correction values set in the first correction table in the memory is a negative value; and
each of the second valve opening correction values set in the second correction table in the memory is a positive value.

6. A rotary valve device, comprising:
a valve to adjust an amount of opening of a flow path through which a fluid flows;
a valve rod linked to the valve;
a driver configured to rotate the valve rod;
processing circuitry configured to
detect an amount of opening of the valve from a rotational position of the valve rod,
use, as a valve opening measured value, the detected amount of opening of the valve to control, using a control process, a rotation quantity of the valve rod by the driver so that the valve opening measured value will match an initial valve opening setpoint, and
correct the initial valve opening setpoint to generate a corrected valve opening setpoint, to use in the control process, by a correction value that takes into account an amount of twist of the valve rod not reflected in the detected amount of opening of the valve;
a differential pressure detector configured to detect, as a front-back differential pressure across the valve, a differential pressure between a pressure of a fluid on a primary side of the valve and a pressure of a fluid on a secondary side of the valve; and
a memory storing a correction table indicating a valve opening correction value corresponding to a combination of an amount of opening of the valve and the front-back differential pressure across the valve, wherein:
the processing circuitry is further configured to acquire, from the correction table, a particular valve opening correction value corresponding to the detected amount of opening of the valve and the detected front-back differential pressure across the valve, and use the acquired particular valve opening correction value as the correction value that takes into account the amount of twist of the valve rod.

* * * * *